United States Patent [19]
Wiley

[11] Patent Number: 6,003,063
[45] Date of Patent: Dec. 14, 1999

[54] COMPUTER SYSTEM WITH CONTEXT SWITCH AND PROGRAM DEVELOPMENT THEREFOR

[75] Inventor: Steve R. Wiley, Boise, Id.

[73] Assignee: Hewlett-Packard Company, Palo Alto, Calif.

[21] Appl. No.: 08/654,515

[22] Filed: May 28, 1996

[51] Int. Cl.⁶ .................................................. G06F 9/00
[52] U.S. Cl. ........................................ 709/108; 345/338
[58] Field of Search ................................. 395/701, 678, 395/674, 710; 709/108, 104, 100, 102, 300; 345/338; 745/338

[56] References Cited

U.S. PATENT DOCUMENTS

| | | | |
|---|---|---|---|
| 5,434,963 | 7/1995 | Kuwamoto et al. | 345/338 |
| 5,509,134 | 4/1996 | Fandrich et al. | 395/430 |
| 5,515,536 | 5/1996 | Corbett et al. | 709/305 |
| 5,535,323 | 7/1996 | Miller et al. | 345/338 |
| 5,634,114 | 5/1997 | Shipley et al. | 395/500 |

FOREIGN PATENT DOCUMENTS

0325443A2  7/1997  European Pat. Off. .......... G06F 9/44

OTHER PUBLICATIONS

Ian Sommerville et al; "The Eclipse User Interface"; Software Practice & Experience, vol. 19, No. 4, pp. 371–391.
European Search Report.

*Primary Examiner*—Majid A. Banankhah

[57] ABSTRACT

When a first application program raises an error condition, a context switch, in one embodiment, transfers control to one of several Help programs, as selected automatically without user or system operator intervention. Such a first application program operates on a computer system that includes a file system, a data structure in memory, and a processor that executes in sequence an operating system, the first application program, a constructor, and a second application program, for example, a Help program. For each candidate Help program, the constructor looks for prerequisite files in the file system. If a candidate Help program's prerequisites are met, the constructor sets a link value in the data structure that directs a subsequent call from the first application program to the Help program selected by the constructor. In a second embodiment, a general method of developing the first application program for context switching incorporates the step of including, in the first application program, a transfer of control to a destination program identified by a constructor, wherein the constructor, precluding manual direction by an operator, identifies the destination program from several candidates by testing an operational prerequisite.

25 Claims, 2 Drawing Sheets

COMPUTER SYSTEM WITH CONTEXT SWITCH AND PROGRAM DEVELOPMENT THEREFOR

FIELD OF THE INVENTION

Embodiments of the present invention relate to application program context switching and to systems of application programs identified without user direction.

BACKGROUND OF THE INVENTION

As an introduction to the problems solved by the present invention, consider the conventional general purpose computer having an operating system and a number of user interactive application programs. Suppose that a user of such a system operates a conventional spreadsheet application program. And, suppose the user misspells a filename at a prompt within the spreadsheet program.

A conventional application program responds in one of several ways: (a) by displaying an operating system message such as "File not found.", or (b) by displaying a message that interprets the situation of the application program, such as "A graphics file (.GRF) cannot be opened in this directory having the name you specified.", or (c) by dynamically loading another application program, such as a general purpose Help program that presents a message and an opportunity for the user to explore related information, much like using an operator manual.

In (a) above, the operating system detects the user's error and executes a subroutine that prints a numbered generic message. Few users find such information instructive. In (b) above, the spreadsheet program intercepts the operating system error and, rather than allowing the operating system to perpetrate confusion or panic, executes a subroutine that prints a numbered message with some detail that may assist an experienced user. In (c) above, the spreadsheet program blocks the operating system message, as before, and invokes a context switch to a predetermined Help program. Conventionally, the spreadsheet program will have passed a word or phrase to the Help program so that the Help program provides an initially meaningful message from which the user can explore related material. The Help program conventionally uses an indexed message file.

In each of the alternatives presented above messages and executable code are in separate files, often developed by different individuals or companies. By separating the messages from the code, messages can be safely and easily translated into another human language so that the program can be sold in another market. For the spreadsheet program, the concomitant message file is a prerequisite for proper spreadsheet program operation. For the Help program, the concomitant indexed message file is a prerequisite for proper Help program operation.

At the time an application program, such as the spreadsheet program above, is developed, the programmer chooses which level of assistance his program will provide when it encounters an error. If the programmer chooses (c) above, then the name of the Help program executable code file and indexed message file may be hard coded into the spreadsheet program. Consequently, any change to these filenames will require marketing of a revision of the spreadsheet program. A well known alternative is to develop the application program so that, when properly installed on the user's computer system, a Help program chosen by the installer will be used. Any change in these filenames will now require reinstallation of the application program.

All development, marketing, and customer support costs are eventually borne by the user. The total cost to the user of marketing a revision, though costly, may be exceeded by the total cost of reinstallation. Reinstallation can involve gathering information from more than one supplier and making choices with insufficient understanding of the consequences. Therefore, considerable customer support is ordinarily expected by the installer.

Because a general purpose computer system is likely to currently support a large number of application programs, each one being reinstalled when a revision becomes available, users of such systems are tacitly required to learn different styles of interaction with different application programs. Displays from different application programs have varied appearances and content. Operating methods that work well with one application cause errors in others. These differences lead to inadvertent user error, increased user frustration, and a growing demand for application programs that seem to operate uniformly.

The Help program chosen by the spreadsheet application program developer or installer may vary from the choice made for another application program, for example a word-processor. Such variation exemplifies further nonuniformity in the user's operating environment. Without appeal, the user must acquiesce to learn not only the nuances of several application programs, but also the best ways to use several different Help programs. Unfortunately, many users risk loss of data and waste operator time and system resources attempting to learn by trial and error.

SUMMARY OF THE INVENTION

Accordingly, a computer system in one embodiment of the present invention includes a file system, a memory, and a processor. The file system maintains a plurality of files for access to the processor. The memory includes a data structure having a link value. The processor executes in sequence an operating system, a first application program, a constructor, and a second application program. The constructor determines that a file is accessible to the processor from the file system for use with the second application program and then sets the link value accordingly. The first application program then precludes operator manual direction by being directed to the second application program in response to the data structure.

According to a first aspect of such an embodiment, when a prerequisite file is accessible, control automatically passes to the related second application program. Because the first application program refers to the constructor and not to the second application program, the first application program is independent of the name and prerequisites of the second application program. When the second application program is revised or an alternative to the second program becomes available, no revision to the first application program is made necessary.

According to a second aspect, the same second application program can be made available to many independent first application programs. The user enjoys operational uniformity among applications.

According to a third aspect, when a revision or alternative to the second application becomes available, the user avoids reinstallation of application programs.

According to another embodiment of the present invention, the constructor verifies that a prerequisite system resource is met, of which access to a file is but one example.

According to an aspect of such an embodiment, the constructor selects the second application program having the most manageable system resource prerequisites at the time the selection is made. Operation and responsiveness of dynamic computer systems improves.

The present invention may be practiced according to a method for developing an application program, in one embodiment, which incorporates the step of including, in the application program, means for passing control to a destination program. The destination program is identified by a constructor. The constructor precludes manual direction by an operator and identifies the destination program from a plurality of candidate programs after testing a respective operational prerequisite of a respective candidate program.

According to a first aspect of such a method, by including such means for passing control, the application program is made independent of any development of the destination program. Such independence allows the first application program and the second application program to be developed by different entities, at different times, and with different revision installation dates on any particular computer system. The costs of marketing the first and the second application program are reduced. Barriers to market entry by competitors are removed. And, users are more likely to develop brand loyalty by better appreciating the capabilities of both the first and the second application programs.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

DETAILED DESCRIPTION OF THE PREFERRED EMBODIMENT

Figure 1:
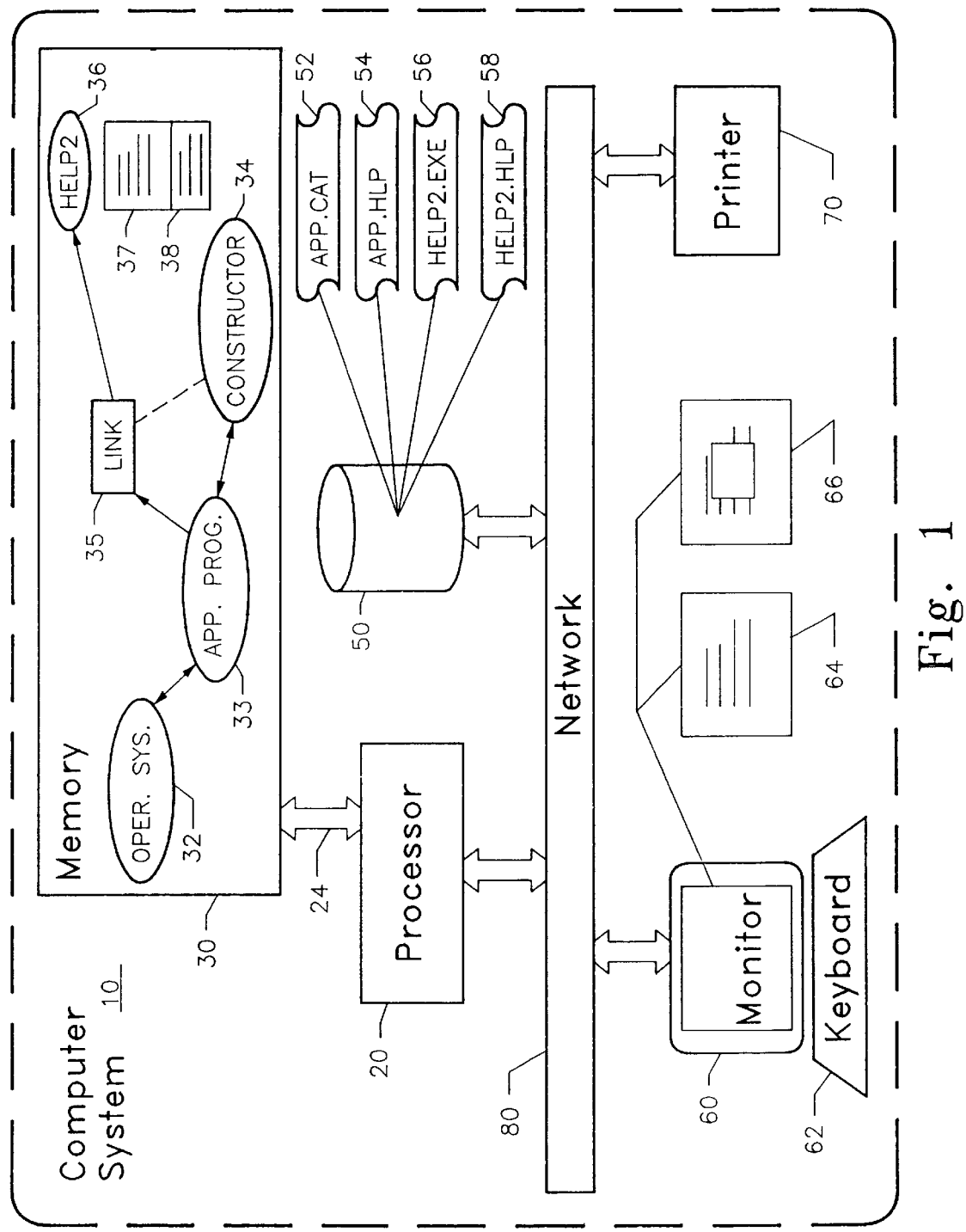
FIG. 1 is a block diagram of a computer system of the present invention.

FIG. 1 is a block diagram of a computer system of the present invention. Computer system 10, in the illustrated embodiment, includes conventional equipment conventionally connected, yet programmed to cooperate in novel ways. Computer system 10 includes processor 20 coupled to memory 30. In addition, processor 20, file system 50, monitor 60, keyboard 62, and printer 70 are coupled by network 80.

Processor 20 is a general purpose computer that provides and receives signals 24 to and from memory 30. Memory 30 is a random access memory system for storing data, for example, executable program code, data structures, and file buffers. File system 50 is a file storage and retrieval system such as a disk system including read only devices and read/write devices. Tape based storage and optical storage systems, for example, are equivalent. File system 50 represents any storage and retrieval system based on logical or physical units of information storage and retrieval, such as a sector or filename. Monitor 60 and keyboard 62 cooperate as means for user interactive control. Printer 70 provides hardcopy output and represents any of several conventional peripheral devices including plotters, communication equipment, and process control instrumentation, to name a few examples.

After processor 30 loads operating system 32 by transferring an executable file from file system 50 to memory 30, execution of operating system 32 provides an opportunity for user interactive selection of a first application program. First application 33 is then loaded like operating system 32 and execution begins. While operating system 32 is a conventional multitasking operating system, first application 33 was developed according to a method of the present invention to be discussed with reference to FIG. 2. As a consequence of such development, first application 33 includes a library of subroutines including constructor 34.

First application program 33 instantiates variables, in a conventional manner, including data structure 35 in memory 30, by designating unique addressable locations in memory 30 according to the size and type of each variable. Data structure 35 includes a link value left undefined by first application 33. Data structure 35 in one embodiment is instantiated according to the following C programming language syntax:

```
struct {
    char *search_volume_and_path;
    char *found_volume_and_path;
    void second_app(int);
    void second_app_setup();
    char *second_app_name;
};
```

The link value in the foregoing syntax is the entry point to function second_app. The link value, to be assigned by constructor 34, is pivotal to the operation of a context switch.

A context switch is an interruption in the execution of a first program so that a second program may be executed. In some operating systems operation of the first program continues only after the second program has returned control to it. In other operating systems the second program can continue to operate after returning control to the first program. A context switch is more than a program call instruction. Not only is the flow of program control interrupted, but the displays presented to the user and the controls made available to the user are governed not by the first program's operating rules but by the second program's operating rules. As illustrated in FIG. 1, a first context 64 is replaced with a second context 66 having an overlaid window that indicates possible return to context 64. The interior of the overlaid window is controlled by the second program.

A context switch is conventionally used in several situations. A few conventional examples include: (a) when an operating system offers the user the opportunity to select an application for execution, (b) when a spreadsheet program alternates between tabular and graphics display of numerical data, (c) when a wordprocessor alternates between document entry and use of a dictionary, (d) when a test program development tool alternates between test program syntax entry and test program dynamic debugging. In example (a) the second or destination program is identified by user choice. In examples (b), (c), and (d) the destination program is conventionally identified by program developer's or installer's choice. In the computer system of FIG. 1, the destination program of the context switch is identified by constructor 34.

Prior to the first time that a context switch is to be used, first application 33 sets parametric values in data structure 35 and then calls constructor 34. First application 33 defines the string search_volume_and_path to identify a subset of the files in file system 50 to be searched for prerequisite files. First application 33 calls constructor 34 either as a preliminary activity or at a time immediately prior to use of the context switch.

Constructor 34 reads data structure 35 and performs a search of file system 50 for prerequisite files. File system 50 includes APP.CAT file 52, APP.HLP file 54, HELP2.EXE file 56, and HELP2.HLP file 58. When first application 33 was installed, APP.HLP and APP.CAT were loaded in file system 50. File APP.CAT contains brief numbered messages. File APP.HLP contains indexed messages operative with Help program HELP2.EXE as an on-screen first application operator manual. File HELP2.HLP contains indexed messages operative with Help program HELP2.EXE as an on-screen Help2 operator manual. In addition, HELP2.HLP contains operator manual information describing features of operating system 32 which may be explored by the user who needs fundamental assistance in operation of computer system 10.

Constructor 34 is a subroutine prepared with conventional programming techniques. Constructor 34 was developed with foreknowledge of several Help systems: a primitive message display subroutine that is part of first application 33, a help system HELP1 that uses files having filenames identified with the wildcard *.hv, and a help system HELP2 that uses files having filenames identified with the wildcard *.hlp.

As an example of the operation of constructor 34, consider the following first session (not illustrated). Constructor 34, using conventional operating system calls, searches file system 50 beginning at the search_volume_and_path for the existence and accessibility of files with wildcard *.hv. None are found. Constructor then continues the search for files having wildcard *.hlp. None are found. After verifying the existence of APP.CAT, constructor 34 then (1) assigns an appropriate value to string found_volume_and_path of data structure 35; (2) determines the entry point for simple help as a subroutine call within constructor 34 and assigns the appropriate value to second_app; (3) determines the entry point for the initialization subroutine (if any) for the subroutine and assigns the appropriate value to second_app_setup; (4) instantiates a file buffer and loads files APP.CAT 52; (5) assigns a value to the string second_app_name; and (7) returns control to first application 33. These actions by constructor 34 effectively couple first application 33 to a simple help subroutine in constructor 34 based on the choice of possible applications made by constructor 34. Because no opportunity for operator selection exists either before, during, or after operation of constructor 34, constructor 34 precludes operator manual direction by the user, a system operator, if any, or an installer.

As a further example of the operation of constructor 34, consider the following second session illustrated by FIG. 1. Constructor 34, using conventional operating system calls, searches file system 50 beginning at the search_volume_and_path for the existence and accessibility of files with wildcard *.hv. None are found. Constructor then continues the search for files having wildcard *.hlp. Files 54 and 58 are found to exist and are currently available for access. Having found the prerequisite files for Help program HELP2, constructor 34 then searches for file HELP2.EXE. Having found the executable code file for Help program HELP2, constructor 34 (1) assigns an appropriate value to string found_volume_and_path of data structure 35; (2) loads file HELP2.EXE 56 as dormant second application 36; (3) determines the entry point of a parameter transformation subroutine in constructor 36 and assigns the appropriate value to second_app; (4) determines the entry point for the initialization subroutine for second application 36 and assigns the appropriate value to second_app_setup; (5) instantiates file buffers 37 and 38 and loads files APP.HLP 54 and HELP2.HLP 58, respectively; (6) assigns a value to the string second_app_name; and (7) returns control to first application 33. These actions by constructor 34 effectively couple first application 33 to second application 36 based on the choice of possible applications made by constructor 34. Because no opportunity for operator selection exists either before, during, or after operation of constructor 34, constructor 34 precludes operator manual direction by the user, a system operator, if any, or an installer.

The structure of files *.HLP follow conventions widely used in application program development for UNIX and Microsoft Windows applications. The file APP.CAT takes advantage of an existing conventional structure for *.CAT files to implement novel means for converting an integer message number to a locator for use in a file having the structure of a *.HLP file.

In the first session the integer parameter passed from first application 33 to the constructor subroutine is sufficient for locating a simple message in file APP.CAT. In the second session, constructor 34 reserves the entry point to second_app for use by the parameter transformation subroutine. At the time of a context switch, when first application 33 has determined an integer value to be passed to second_app, the parameter transformation subroutine reads the integer. Then the parameter transformation subroutine (1) uses a transform from file APP.CAT to determine a corresponding word or phrase; (2) calls second_app at the entry point reserved; and (3) passes the word or phrase as the parameter, in place of the integer. The parameter transformation subroutine is developed using conventional programming techniques including string to integer conversion and string substitution. Transform data and the structure of file APP.CAT will be described with reference to FIG. 2 at step 320.

In an alternate embodiment, constructor 36 discards the possibility of loading a candidate second application when other system prerequisites are not first met. Examples of such other prerequisites include, but are not limited to, obtaining sufficient memory for loading and operating the candidate; obtaining access to a particular communication channel, file server, peripheral, instrument, or process control device; or verifying schedule prerequisites such as operation only during predetermined times of day or selected days. On the other hand, in yet another alternate embodiment, constructor 36 uses prior results to choose more quickly. For example, constructor 36 chooses the same second application program as chosen in a prior call that obtained nonexclusive access to a particular candidate second application.

Figure 2:
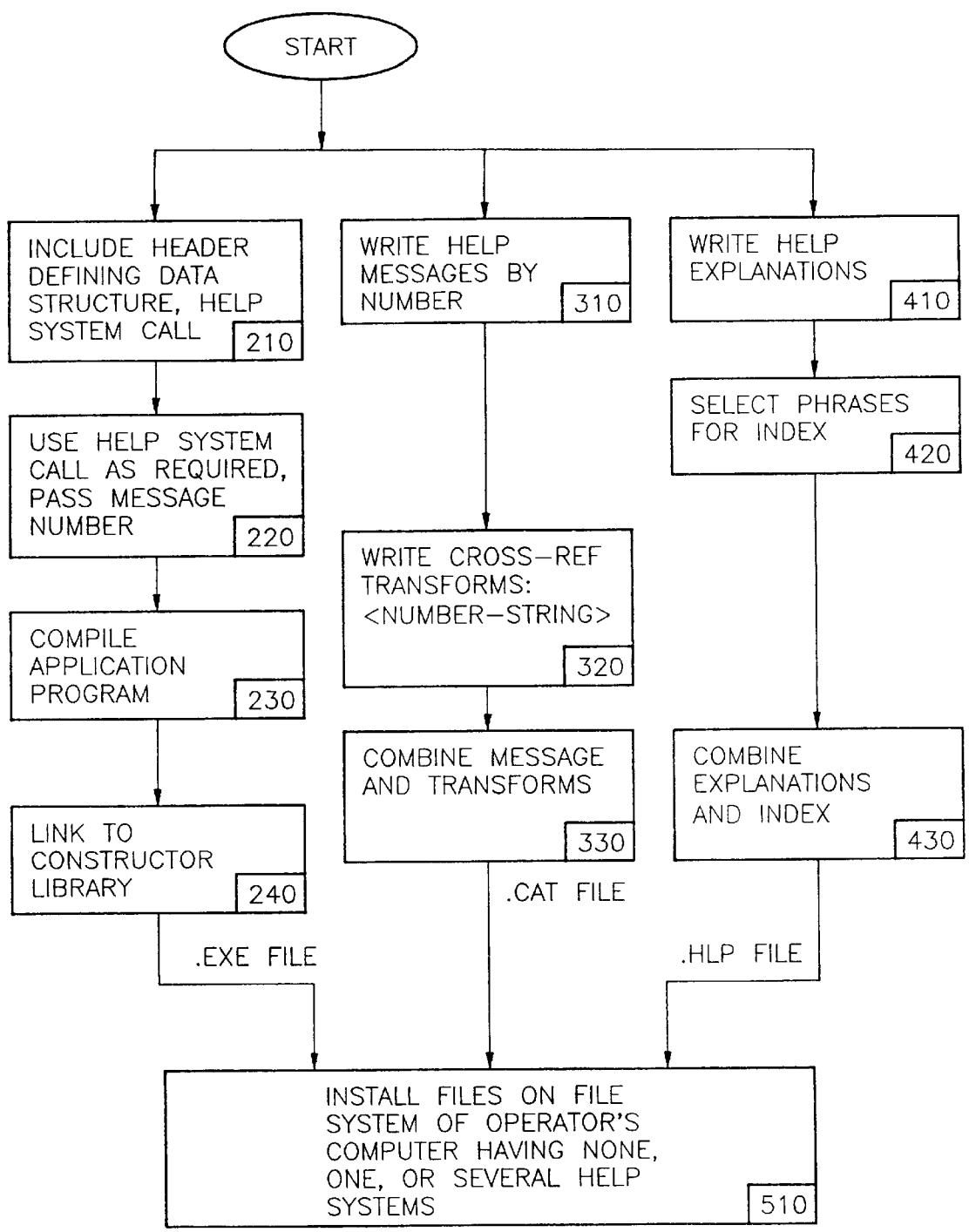
FIG. 2 is a flow chart of a method of the present invention.

FIG. 2 is a flow chart of a method of application program development of the present invention. The method involves three parallel paths amenable to development by independent groups or members of a program development team. Steps 210 through 240 provide the executable code file for the application. Steps 310 through 330 provide prerequisite *.CAT files and steps 410 through 430 provide prerequisite *.HLP flies for one or more candidate second application programs. The first and second application programs cooperate as already described for processes 33 and 36, respectively, with reference to FIG. 1. In the discussion below, development of first application 33 and prerequisite files for second application HELP2.EXE will be described to clearly illustrate a few embodiments of the present invention. Development is described using terminology which has come to have specific meaning to those who use the conventional C programming language.

At step 210 a header file is prepared and included in the source code for first application. The header file contains declarations for data structure 35 and a prototype for the call to second_app. Initialization of variables, allocation of dynamic variable space, and calls to initialization entry points for various routines including constructor 34 are made using conventional techniques.

At step 220, use of the call to second_app is made when a context switch is deemed appropriate by the application developer. The application developer, at each instance where a context switch is desired, specifies the level of support appropriate to the instance, and specifies a parameter. The parameter may be either a word or phrase for use with level 1 and higher programs; or it may be the string representation of an integer message number for quick level 0 support. By specifying level 0 support, the time required by constructor 34 to choose and load a candidate second application is avoided.

At step 230, the source code prepared in steps 210 and 220 is submitted to a compiler for generation of a relocatable object.

At step 240, the relocatable object from step 230 is linked to various libraries. One of the libraries of subroutines contains constructor 34 with a simple message posting subroutine and a parameter transformation subroutine. The library having constructor 34 is developed using conventional programming techniques as directed by the functional and operational descriptions of constructor 34 detailed above. The result of linking at step 240 is an executable file, which for first application 33, is APP.EXE.

At step 310, numbered messages are written. Each message corresponds to a condition anticipated by first application 33. Such a condition may be an abnormal condition or an opportunity for the user to call for help prior to an abnormal condition. Each message is identified with digits corresponding to an integer, though the text of the message may be in any human language. Example numbered messages are as shown:

```
$001 File not found.
$002 A graphics file (.GRF) cannot be opened in this directory
      having the name you specified.
...
```

At step 320 a transform is written for every numbered message. Each transform includes digits representing the respective integer and a word or phrase indexed in a .HLP file.

At step 330, transforms written at step 320 are combined with numbered messages written in step 310. The resulting hierarchical file has a structure consistent with the conventional Natural Language Support system familiar to application program developers whose application programs are compatible with the UNIX operating system. The hierarchical structure of the file distinguishes primitive numbered help messages from transforms by grouping transforms in a first set and messages in a second set. An example of a portion of a hierarchical file is as shown:

```
set $123
$001 pathname
$002 graphics filename
...
set $124
$001 File not found.
$002 A graphics file (.GRF) cannot be opened in this directory
      having the name you specified.
...
```

The hierarchical file consists of two sets. The first set includes transforms; the second set includes numbered messages. File APP.CAT results from a conventional compilation of the hierarchical file at step 310.

At step 410, the content of an operators manual is used to prepare a large number of topical explanations. At step 420 these explanations are reviewed and meaningful words and phrases are selected. The selected words and phrases are then listed for use as an index into the topical explanations. Selection of the words and phrases is made in cooperation with the development of transforms at step 320. At step 330, the index and explanations are conventionally combined into a file or files of conventional structure indicated generally as file APP.HLP.

At step 510, APP.EXE, APP.CAT, and APP.HLP are installed on a user's computer system. Any number of candidate programs known a priori by constructor 34 may be concurrently or subsequently installed on the user's computer system. Each candidate program will have several files such as HELP2.EXE and HELP2.HLP as shown for the Help2 program in FIG. 1. Future installation of other candidate programs will be supported by APP.EXE without change to APP.EXE. Future revisions to constructor 34 and consistent revisions to the hierarchical file are made by distributing a revision to first application 33 as a revised set of files APP.EXE (possibly containing a revised constructor), APP.CAT (possibly including other sets), and APP.HLP.

In an embodiment with additional capability, first application 33 calls second application program in one of two ways by using one of two entry points. Data structure 35 is expanded to include the second entry point and constructor 34 is equipped to distinguish and process either of the types of calls. The first entry point operates with integer numbered messages as discussed with the first session, above. The second entry point operates with phrase substitution for the integer as discussed with the second session, above. Operation from the first entry point is significantly faster, providing a more responsive user interface. The dual entry point capability is compatible with conventional Help programs, such as "VUE" by Hewlett-Packard, "CDE" by COSE Alliance, and "HyperHelp" by Bristol Technologies.

The foregoing description discusses preferred embodiments of the present invention, which may be changed or modified without departing from the scope of the present invention.

For example, in an alternate embodiment, computer system 10 is a personal computer and files 52 through 58 are conveyed to processor 20 in part via a public communication channel. In still another alternate embodiment, computer system 10 is a distributed processing system hosted on a network of workstations wherein processes 33 and 36 are executed on physically separate but logically coupled platforms. Processor 20 in an alternate embodiment is a microprocessor. Memory 30 in alternate embodiments includes a mix of read only and dynamic read/write memory. Operating system 32 in a preferred embodiment is a UNIX compatible operating system, however in alternate embodiments compatibility is with other multitasking operating systems such as Microsoft "DOS", "NT", or "Windows" operating systems. Network 80 in one embodiment is a bus between circuit cards and in a second and equivalent embodiment is a company-wide data network. Monitor 60 and keyboard 62 are omitted in an alternate embodiment for process control wherein support for first application 33 is not intended to improve user interaction but for supporting variation in instrument compatibility, accuracy, system response, sparing, and similar systems operational objectives.

Still further, those skilled in the art will understand that first application program 33 and candidate second application programs are not limited to the examples discussed herein. First application program is representative of any software and second application program is representative of any separately compiled program or library including those enforcing a convention such as spell checkers, grammar checkers, CAD design rule checkers, and program syntax checkers, as well as member programs of functional sets such as documentation viewers (including help systems), tutorials, simulators, signal processors, software and system diagnostics, graphic processors, system performance monitors, numerical and statistical analyzers, data entry/edit tools, database applications, and speech and musical processors, to name just a few functional units.

These and other changes and modifications are intended to be included within the scope of the present invention.

While for the sake of clarity and ease of description, several specific embodiments of the invention have been described; the scope of the invention is intended to be measured by the claims as set forth below. The description is not intended to be exhaustive or to limit the invention to the form disclosed. Other embodiments of the invention will be apparent in light of the disclosure to one of ordinary skill in the art to which the invention applies.

What is claimed is:

1. A computer system comprising:
   a. a file system that maintains a plurality of files;
   b. a memory comprising a link value; and
   c. a processor that executes in sequence an operating system program, a first application program, a constructor, and a second application program, wherein:
      (1) the constructor sets the link value in response to determining whether a file is accessible to the processor from the file system for use with the second application program; and
      (2) a call in the first application program precludes operator manual direction by being directed to the second application program in response to the link value.

2. The computer system of claim 1 wherein:
   a. the first application program is used by an operator; and
   b. the second application program informs the operator on conventional use of the first application program.

3. The computer system of claim 1 wherein control is passed to the constructor in response to the first application program.

4. The computer system of claim 1 wherein the second application program is dynamically loaded in response to the constructor.

5. A computer system comprising:
   a. a file systems that provides access to a plurality of files; and
   b. context switch operative to transform the state of the computer system from a first context to a second context selected from a plurality of contexts, each context having a respective requisite file, the context switch comprising:
      (1) a link value;
      (2) a constructor that sets the link value in response to selecting the second context, wherein selecting comprises verifying, for at least one context of the plurality, access to a respective requisite file from the file system; and
      (3) a control transfer instruction, performed in the first context, wherein the instruction precludes operator manual direction by being directed in response to the link value.

6. A context switch comprising:
   a. a first instruction that transfers program control to a constructor, wherein the constructor identifies a destination in response to testing a predetermined processor resource; and
   b. a second instruction that transfers program control to the destination.

7. The context switch of claim 6 wherein testing comprises testing access to a file.

8. The context switch of claim 6 further comprising a link that is assigned a value by the constructor.

9. The context switch of claim 6 wherein:
   a. the constructor identifies the destination from a plurality of candidate programs; and
   b. testing comprises testing a respective operational prerequisite of a respective candidate program.

10. The context switch of claim 9 wherein:
    a. the second instruction is executed from a first context; and
    b. the candidate program in operation provides a status of the operation of the first context.

11. The context switch of claim 9 wherein:
    a. the second instruction is executed from a first context; and
    b. the candidate program in operation provides information for operator interaction in the first context.

12. The context switch of claim 11 wherein the information comprises notice of a rule of the first context.

13. The context switch of claim 11 wherein the information comprises notice of a rule for data entry in the first context.

14. The context switch of claim 11 wherein the information comprises notice of a convention in the first context.

15. The context switch of claim 9 further comprising a parameter, wherein the constructor transforms the parameter for use by the destination program according to a respective transformation of the respective candidate program.

16. The context switch of claim 15 wherein:
    a. the parameter is provided in the first context; and
    b. the parameter is transformed for the candidate program by the constructor before transferring program control to the destination.

17. The context switch of claim 16 wherein:
    a. the constructor transforms the parameter in response to a plurality of rules; and
    b. each rule comprises an integer parameter and a corresponding string parameter.

18. The context switch of claim 17 wherein:
    a. the plurality of rules are contained in a file; and
    b. the file further comprises data used by the respective candidate program for informing an operator.

19. The context switch of claim 9 wherein the respective operational prerequisite of the respective candidate program comprises access to a predetermined file.

20. The context switch of claim 9 wherein the respective operational prerequisite of the respective candidate program comprises access to at least one file identifiable by a predetermined filename mask.

21. A computer system comprising:
    a. a memory comprising a link value; and
    b. a processor that executes in sequence an operating system program, a first application program and a constructor in a first context, and a second application program in a second context, wherein:

(1) the first application program is used by an operator;
(2) the second application program informs the operator on conventional use of the first application program;
(3) the constructor sets the link value in response to testing an operational prerequisite of the second application program; and
(4) a call in the first application program precludes operator manual direction by being directed to the second application program in response to the link value.

22. The computer system of claim 21 wherein the first application program and the constructor comprise one program file.

23. A computer system comprising:
a. a file system that provides access to a plurality of files; and
b. a context switch operative to transform the state of the computer system from a first context to a second context selected from a plurality of contexts, each context having a respective requisite file, the context switch comprising:
   (1) a data structure comprising a link value;
   (2) a constructor that sets the link value in response to selecting the second context, wherein selecting comprises testing an operational prerequisite of a candidate program operative in the second context, the candidate program in operation providing notice of a rule for data entry in the first context; and
   (3) a control transfer instruction, performed in the first context, wherein the instruction precludes operator manual direction by being directed in response to the link value.

24. A computer system comprising:
a. a file system that provides access to a plurality of files; and
b. a context switch comprising:
   (1) a first instruction that transfers program control to a constructor, wherein the constructor identifies a destination program in response to testing a predetermined processor resource, verifies access to a file of the destination program from the file system, and identifies a destination with reference to contents of the file; and
   (2) a second instruction that transfers program control to the destination.

25. The computer system of claim 24 wherein:
a. the context switch further comprises a parameter; and
b. the constructor transforms the parameter for use by the destination program.

* * * * *